US012305849B1

(12) United States Patent
Liu

(10) Patent No.: US 12,305,849 B1
(45) Date of Patent: May 20, 2025

(54) MULTI-MODE MUSIC SYCN RGB LED LIGHT

(71) Applicant: Changsha Xinmuyouju Supply Chain Management Service Co., Ltd, Changsha (CN)

(72) Inventor: Zhaona Liu, Changsha (CN)

( * ) Notice: Subject to any disclaimer, the term of this patent is extended or adjusted under 35 U.S.C. 154(b) by 0 days.

(21) Appl. No.: 19/021,824

(22) Filed: Jan. 15, 2025

(51) Int. Cl.

| | |
|---|---|
| ***F21V 33/00*** | (2006.01) |
| ***F21V 3/04*** | (2018.01) |
| ***F21V 15/015*** | (2006.01) |
| ***F21V 19/00*** | (2006.01) |
| ***F21V 23/04*** | (2006.01) |
| ***F21V 23/06*** | (2006.01) |
| *F21Y 115/10* | (2016.01) |

(52) U.S. Cl.
CPC .......... *F21V 33/0056* (2013.01); *F21V 3/049* (2013.01); *F21V 15/015* (2013.01); *F21V 19/0055* (2013.01); *F21V 23/04* (2013.01); *F21V 23/06* (2013.01); *F21V 33/0012* (2013.01); *F21Y 2115/10* (2016.08)

(58) Field of Classification Search
CPC .... F21V 33/0056; F21V 3/049; F21V 23/003; F21V 23/004; F21Y 2103/10; F21Y 2105/10
See application file for complete search history.

(56) References Cited

U.S. PATENT DOCUMENTS

| | | | | |
|---|---|---|---|---|
| 4,992,704 A * | 2/1991 | Stinson | H05B 45/40 | 362/800 |
| 5,081,568 A * | 1/1992 | Dong | F21V 23/0414 | 362/183 |
| 5,994,842 A * | 11/1999 | Wong | F21V 33/0056 | 362/276 |
| 6,158,882 A * | 12/2000 | Bischoff, Jr. | F21S 4/28 | 362/249.05 |
| 6,283,612 B1 * | 9/2001 | Hunter | F21V 15/04 | 362/240 |
| 7,306,349 B2 * | 12/2007 | Waters | F21L 4/00 | 362/171 |
| 7,703,966 B2 * | 4/2010 | Waters | F21L 4/00 | 362/120 |
| 7,938,562 B2 * | 5/2011 | Ivey | F21K 9/232 | 362/276 |
| 8,870,408 B2 * | 10/2014 | Sharrah | F21L 4/00 | 362/249.02 |
| 9,194,555 B2 * | 11/2015 | Urban | H05B 47/165 | |

(Continued)

*Primary Examiner* — Ismael Negron
(74) *Attorney, Agent, or Firm* — Daniel M. Cohn; Howard M. Cohn

(57) ABSTRACT

A Multi-mode music sycn RGB LED Light comprises a pickup light body, wherein the pickup light body comprises a shell and an on-off controller, an LED light bar is arranged inside the shell, the on-off controller is used to control the light mode of the LED light bar, light transmission holes are arranged on both sides and bottom of the shell, the light transmission holes on both sides of the shell are square, the light transmission holes on the bottom of the shell are elliptic, a PVC white transparent frosted film is arranged on one side of the inner wall of the shell, and the LED light bar is installed on the top surface of the inner wall of the shell through screws. A COLOR key and a MODE key are used to respectively control color and pickup modes; the pickup light body can be integrated on the furniture through the screws.

3 Claims, 8 Drawing Sheets

(56) References Cited

U.S. PATENT DOCUMENTS

| | | | | | |
|---|---|---|---|---|---|
| 9,249,970 | B1 * | 2/2016 | Kunzer | F16M 11/28 | |
| 9,410,692 | B2 * | 8/2016 | Wang | A47C 1/00 | |
| 10,161,593 | B2 * | 12/2018 | Bennett | F21V 17/101 | |
| 10,281,119 | B2 * | 5/2019 | Ford | H05B 47/14 | |
| 10,482,778 | B2 * | 11/2019 | Yoo | G09B 9/00 | |
| 10,598,841 | B1 * | 3/2020 | Huang | G06F 3/0202 | |
| 10,631,386 | B1 * | 4/2020 | McRae | H05B 47/155 | |
| 10,724,730 | B2 * | 7/2020 | Bellos | F21V 23/02 | |
| 10,935,221 | B1 * | 3/2021 | Tirosh | F21V 23/0464 | |
| 11,073,648 | B2 * | 7/2021 | Huang | G02B 6/0036 | |
| 11,102,861 | B1 * | 8/2021 | Zolotykh | H05B 45/40 | |
| 11,236,896 | B1 * | 2/2022 | Schiel | F21S 4/28 | |
| 11,265,636 | B1 * | 3/2022 | Kim | F21V 23/003 | |
| 11,415,304 | B1 * | 8/2022 | Zhang | F21V 33/0056 | |
| 2014/0036505 | A1 * | 2/2014 | Barton | F21V 21/005 | 362/249.06 |
| 2018/0334232 | A1 * | 11/2018 | Poole | F21V 23/06 | |

* cited by examiner

MULTI-MODE MUSIC SYCN RGB LED LIGHT

TECHNICAL FIELD

The invention relates to the technical field of pickup lights, in particular to a Multi-mode music syn RGB LED Light.

BACKGROUND ART

Pickup light, also known as microphone light, is a combination unit of microphone and light. Compared with ordinary microphones, pickup lights are more suitable for performance, recording, research and other fields. They are designed to take into account a number of special situations, such as concerts, where the microphones need to have strong anti-interference capabilities and lights need to be provided so that singers can see the audience clearly in front of them.

The existing pickup ambient lights on the market have a single function, mostly have one mode of pickup light effect, and are mainly used in the cars and on the desktops to improve the scene atmosphere, and cannot be combined with the furniture, without ideal use effect.

SUMMARY OF THE INVENTION

To realize the above purpose, the invention provides the following technical proposal: a Multi-mode music sycn RGB LED Light comprises a pickup light body, wherein the pickup light body comprises a shell and an on-off controller, an LED light bar is arranged inside the shell, the on-off controller is used to control the light mode of the LED light bar, and light transmission holes are arranged on both sides and bottom of the shell.

As a preferred technical proposal of the invention, the light transmission holes on both sides of the shell are square, and the light transmission holes on the bottom of the shell are elliptic.

As a preferred technical proposal of the invention, a PVC white transparent frosted film is arranged on one side of the inner wall of the shell.

As a preferred technical proposal of the invention, the LED light bar is installed on the top surface of the inner wall of the shell through screws.

As a preferred technical proposal of the invention, a driver IC and a microphone are integrated on a control board inside the on-off controller.

As a preferred technical proposal of the invention, a POWER key, and a COLOR key and a MODE key respectively located on both sides of the POWER key are integrated on one side of the control board inside the on-off controller.

As a preferred technical proposal of the invention, a DC connector and a USB interface are also arranged on one side of the on-off controller, and a DC socket movably connected with the DC connector is arranged at one end of the LED light bar.

As a preferred technical proposal of the invention, plastic plugs with threaded holes are arranged at both ends of the shell.

As a preferred technical proposal of the invention, wire holes are arranged at both ends on both sides of the shell.

Furniture with a Multi-mode music syn RGB LED Light comprises the Multi-mode music syon RGB LED Light.

Compared with the prior art, the invention provides a Multi-mode music sycn RGB LED Light, which has the following beneficial effects:

compared with the single-function pickup lights on the market, the Multi-mode music syon RGB LED Light has a COLOR key and a MODE key to respectively control the color mode and pickup mode of the LED light bar, and each mode has a variety of light effects to meet the different needs of users; the pickup light body can be integrated on the furniture through the screws, being more convenient to use, offering economic benefits and having a broad application prospect.

Reference signs: 1. Pickup light body; 11. Shell; 111. Wire hole; 12. On-off controller; 121. DC connector; 122. USB interface; 13. LED light bar; 131. DC socket; 14. Light transmission hole; 15. PVC white transparent frosted film; 16. POWER key; 17. COLOR key; 18. MODE key; 19. Plastic plug with threaded hole.

DETAILED DESCRIPTION OF THE INVENTION

The technical proposals in the embodiments of the invention are clearly and completely described in combination with the drawings attached to the embodiments of the invention. Obviously, the described embodiments are only part of the embodiments of the invention, but not all embodiments. All other embodiments derived from the embodiments of the invention by ordinary technicians in the field without creative labor fall within the scope of protection of the invention.

Figure 1:
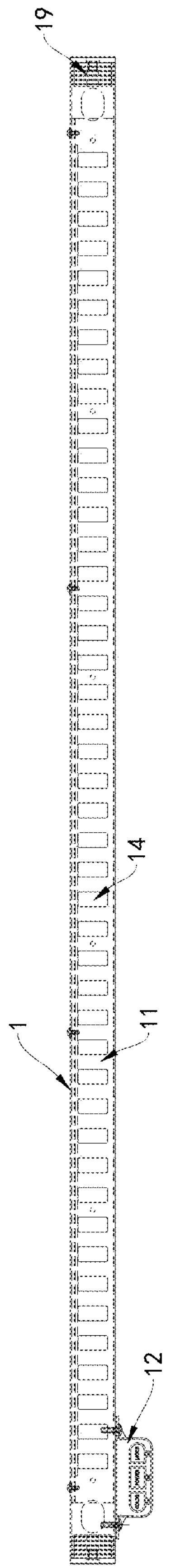
FIG. 1 is the front view of a Multi-mode music sycn RGB LED Light proposed by the invention.
Figure 2:
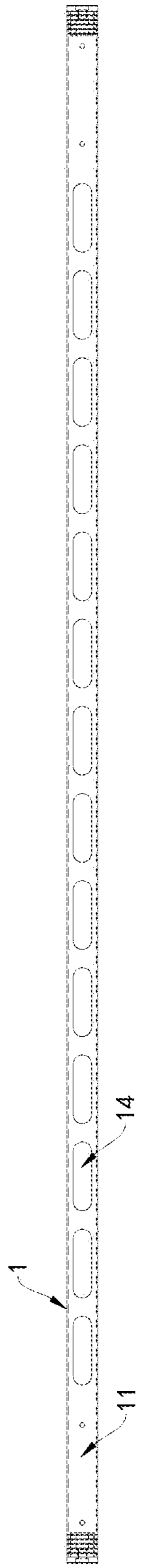
FIG. 2 is the bottom view of a Multi-mode music sycn RGB LED Light proposed by the invention.
Figure 3:
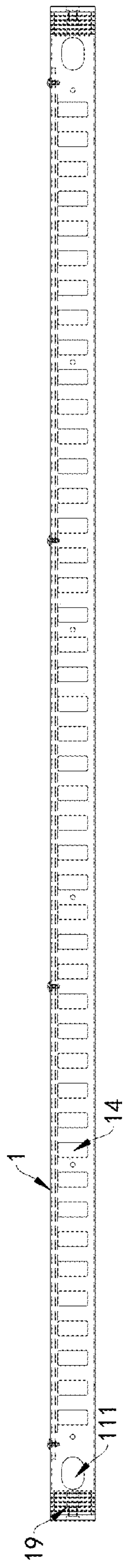
FIG. 3 is the rear view of a Multi-mode music sycn RGB LED Light proposed by the invention.
Figure 4:
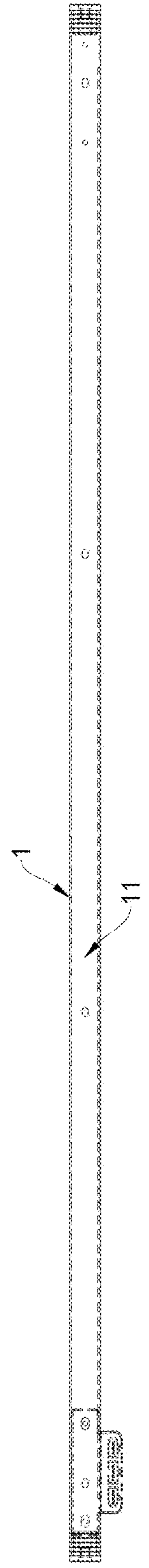
FIG. 4 is the top view of a Multi-mode music sycn RGB LED Light proposed by the invention.
Figure 5:
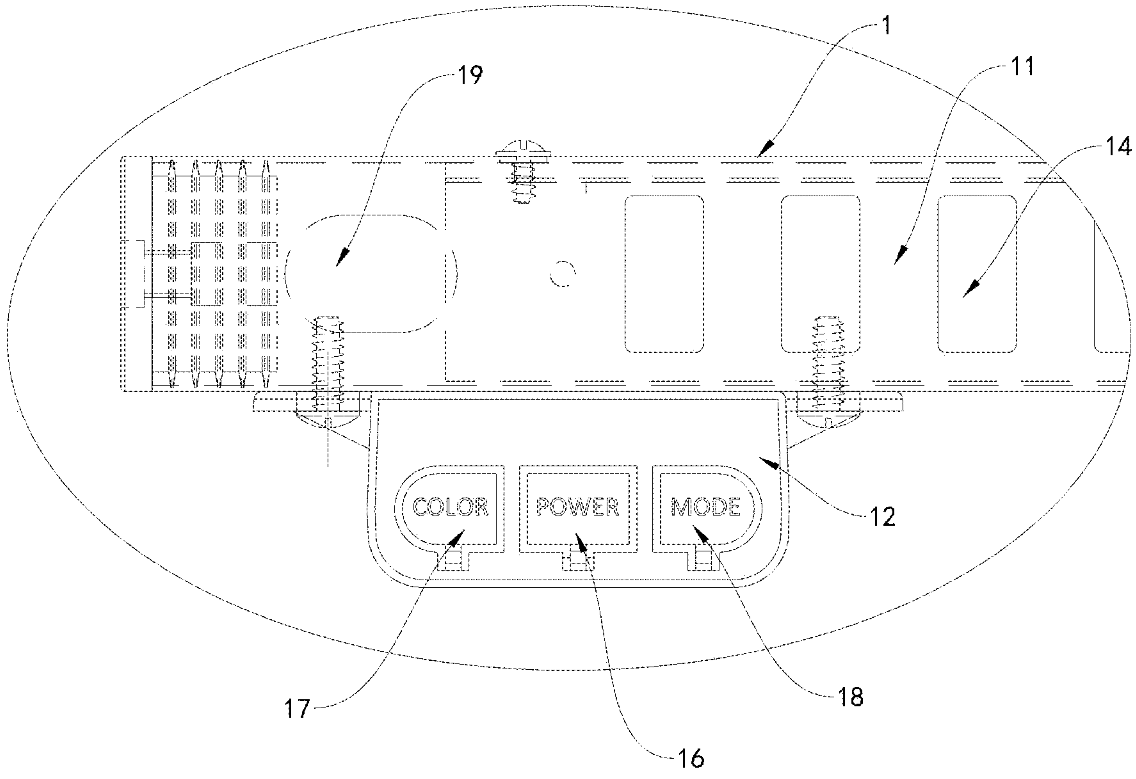
FIG. 5 is the structure diagram of an on-off controller for a Multi-mode music sycn RGB LED Light proposed by the invention.
Figure 6:
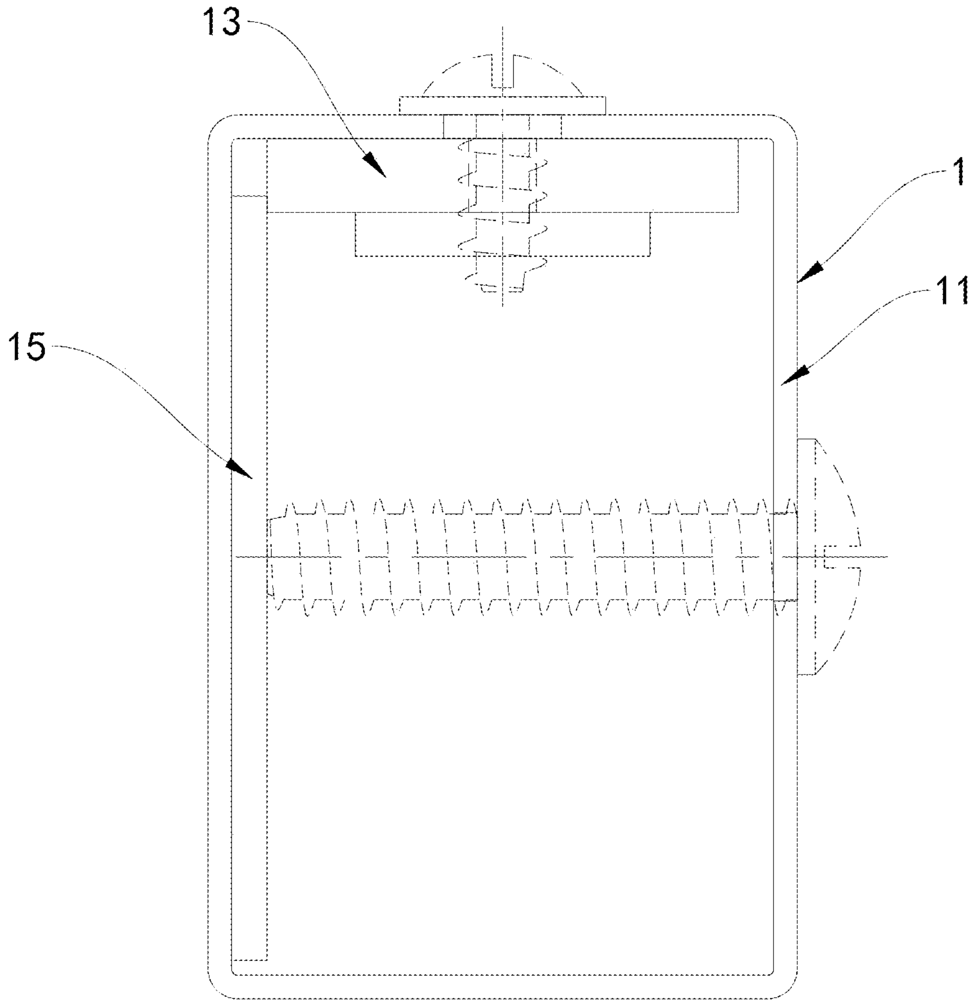
FIG. 6 is the side profile of a shell structure for a Multi-mode music sycn RGB LED Light proposed by the invention.
Figure 7:
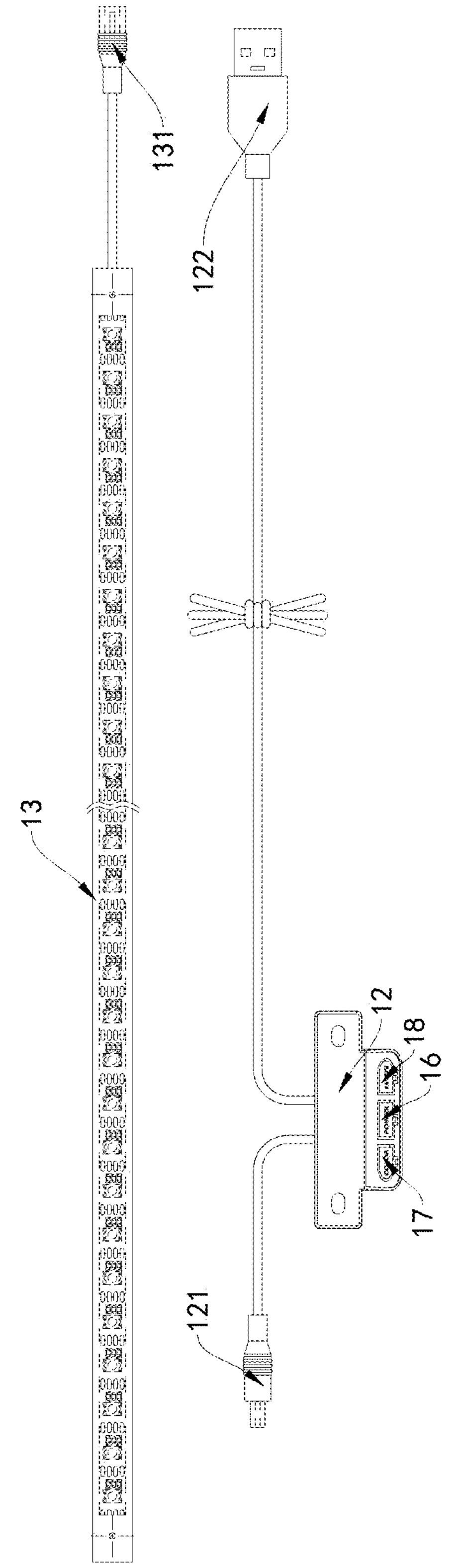
FIG. 7 is the structure diagram of LED light bar and an on-off controller for a Multi-mode music sycn RGB LED Light proposed by the invention.
Figure 8:
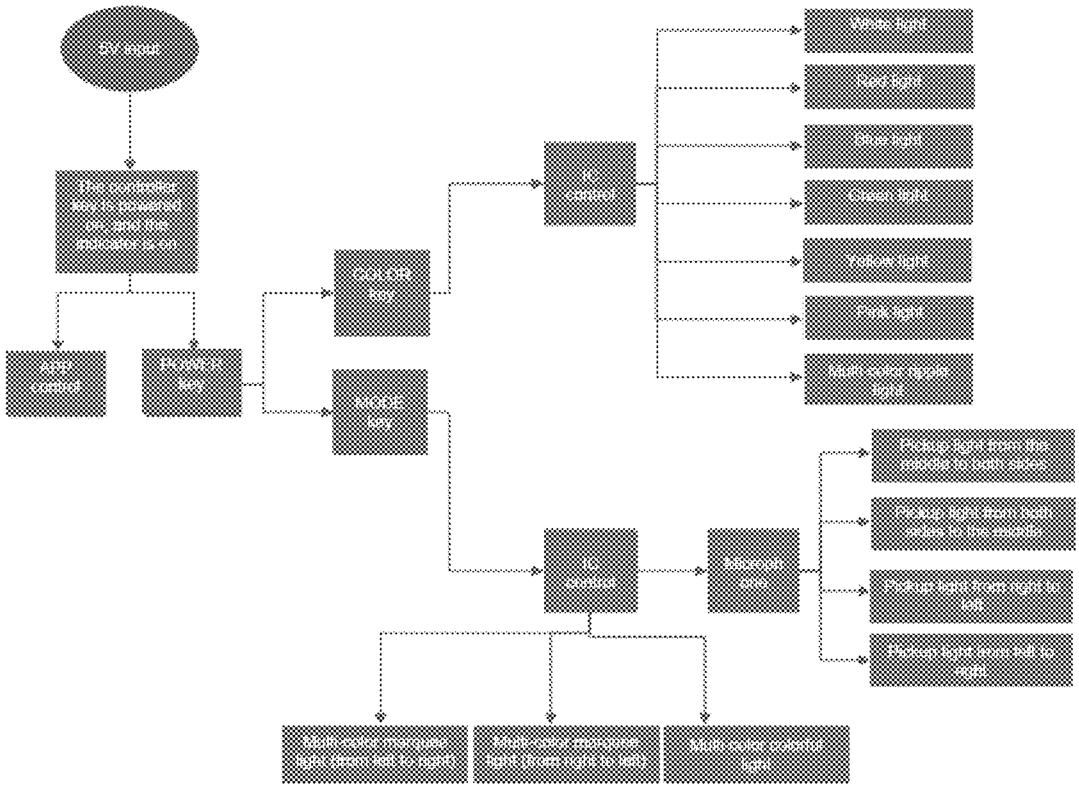
FIG. 8 is the system principle diagram of a pickup light body for a Multi-mode music sycn RGB LED Light proposed by the invention.

As shown in FIG. 1 to FIG. 8, a Multi-mode music sycn RGB LED Light comprises a pickup light body 1, the pickup light body 1 comprises a shell 11 and an on-off controller 12, an LED light bar 13 is arranged inside the shell 11, the on-off controller 12 is used to control the light mode of the LED light bar 13, light transmission holes 14 are arranged on both sides and bottom of the shell 11, the model of LEDs on the LED light bar 13 is 5050, and 60 LEDs are arranged on the LED light bar 13 per meter.

As a specific technical proposal of the embodiment, the light transmission holes 14 on both sides of the shell 11 are square, and the light transmission holes 14 on the bottom of the shell 11 are elliptic.

In the embodiment, both sides of the shell 11 are respectively the front and back of the pickup light body 1, the light transmission holes 14 on the front and back of the shell 11 are rectangular or square, the size of the light transmission holes 14 is not limited, the spacing between a plurality of light transmission holes 14 is consistent, three sides of the shell 11 is pervious to light, and the Multi-mode music syon RGB LED Light creates a better atmosphere and has 3D effect after being turned on.

As a specific technical proposal of the embodiment, a PVC white transparent frosted film 15 is arranged on one side of the inner wall of the shell 11.

In the embodiment, the PVC white transparent frosted film 15 corresponds to the front of the shell 11, avoiding dazzling light from the light transmission holes 14 on the front of the shell 11, and making the user more comfortable.

As a specific technical proposal of the embodiment, the LED light bar 13 is installed on the top surface of the inner wall of the shell 11 through screws, and a driver IC and a microphone are integrated on a control board inside the on-off controller 12.

In the embodiment, the driver IC is used to control the LED light bar 13 to change different light effect modes, and the microphone is used to pick up sound.

As a specific technical proposal of the embodiment, a POWER key 16, and a COLOR key 17 and a MODE key 18 respectively located on both sides of the POWER key 16 are integrated on one side of the control board inside the on-off controller 12.

In the embodiment, the POWER key 16 is used to control the power-on/off of the LED light bar 13, and the COLOR key 17 corresponds to the color mode of the LED light bar 13;

by pressing the COLOR key 17, the driver IC recognizes a signal, and the white light of the LED light bar 13 is on;

by pressing the COLOR key 17 again, the driver IC recognizes a signal, and the blue light of the LED light bar 13 is on;

by pressing the COLOR key 17 again, the driver IC recognizes a signal, and the red light of the LED light bar 13 is on;

by pressing the COLOR key 17 again, the driver IC recognizes a signal, and the green light of the LED light bar 13 is on;

by pressing the COLOR key 17 again, the driver IC recognizes a signal, and the yellow light of the LED light bar 13 is on;

by pressing the COLOR key 17 again, the driver IC recognizes a signal, and the pink light of the LED light bar 13 is on;

By pressing the COLOR key 17 again, the driver IC recognizes a signal, and the multi-color ripple light of the LED light bar 13 is on;

by pressing the COLOR key 17 again, the driver IC recognizes a signal, and the white light of the LED light bar 13 is on, and so on.

The MODE key 18 corresponds to the pickup mode of the LED light bar 13; by pressing the MODE key 18, the driver IC recognizes a microphone signal, and then the pickup light of the LED light bar 13 is on from the middle to both sides;

by pressing the MODE key 18 again, the driver IC recognizes a microphone signal, and the pickup light of the LED light bar 13 is on from both sides to the middle;

by pressing the MODE key 18 again, the driver IC recognizes a microphone signal, and the pickup light of the LED light bar 13 is on from left to right;

by pressing the MODE key 18 again, the driver IC recognizes a microphone signal, and the pickup light of the LED light bar 13 is on from right to left;

by pressing the MODE key 18 again, the driver IC recognizes a signal, the multi-color marquee of the LED light bar 13 is on from left to right;

by pressing the MODE key 18 again, the driver IC recognizes a signal, the multi-color marquee of the LED light bar 13 is on from right to left;

by pressing the MODE key 18 again, the driver IC recognizes a signal, the multi-color colorful light of the LED light bar 13 is on.

As a specific technical proposal of the embodiment, a DC connector 121 and a USB interface 122 are also arranged on one side of the on-off controller 12, and a DC socket 131 movably connected with the DC connector 121 is arranged at one end of the LED light bar 13.

In the embodiment, the USB interface 122 is connected with a POWER adapter, the input voltage of the pickup light body 1 is 5V, and power-on/off is controlled by pressing the POWER key 16.

As a specific technical proposal of the embodiment, plastic plugs 19 with threaded holes are arranged at both ends of the shell 11.

In the embodiment, the plastic plugs 19 with the threaded holes are used to install the pickup light body 1.

As a specific technical proposal of the embodiment, wire holes 111 are arranged at both ends on both sides of the shell 11.

In the embodiment, the wire holes 111 are used pass through the DC connector 121 and the USB interface 122.

Furniture with a Multi-mode music sycn RGB LED Light comprises the Multi-mode music sycn RGB LED Light; the pickup light body 1 is integrated on the furniture through screws, such as a computer desk and a TV cabinet, and can also be fixed on the desktop through screws as an independent ambient light.

To sum up, compared with the single-function pickup lights on the market, the Multi-mode music sycn RGB LED Light has the COLOR key 17 and the MODE key 18 to respectively control the color mode and pickup mode of the LED light bar 13, and each mode has a variety of light effects to meet the different needs of users; the pickup light body 1 can be integrated on the furniture through the screws, being more convenient to use, offering economic benefits and having a broad application prospect.

It should be noted that terms such as "comprising", "containing" or any other variations herein are intended to cover non-exclusive inclusion, so that a process, method, article or device including a series of elements includes those elements as well as other elements not expressly listed, or includes elements inherent to the process, method, article or device. In the absence of further restrictions, an element defined by the sentence "comprising a" does not exclude the existence of additional identical elements in a process, method, article or device comprising the element.

Although the embodiments of the invention have been shown and described, it is understandable that ordinary technicians in the field may change, modify, substitute and vary these embodiments in a variety of ways without deviating from the principle and spirit of the invention. The scope of the invention is limited by the attached claims and their equivalents.

The invention claimed is:

1. A light comprising:

a light body;

a shell having two sides and a bottom;

an LED light bar arranged inside the shell;

an ON-OFF controller configured to control the operation of the LED light bar;

light transmission holes arranged on both sides and bottom of the shell; and screws, wherein the LED light bar is installed on a top surface of an inner wall of the shell by the screws.

2. The light of claim 1, further comprising plastic plugs having threaded holes, the plastic plugs arranged at both ends of the shell.

3. The light of claim 1, further comprising wire holes arranged at both ends on both sides of the shell.

* * * * *